(12) United States Patent
Seo et al.

(10) Patent No.: US 10,719,105 B2
(45) Date of Patent: Jul. 21, 2020

(54) METHOD FOR UTILIZING INPUT DEVICE AND ELECTRONIC DEVICE FOR THE SAME

(71) Applicant: SAMSUNG ELECTRONICS CO., LTD., Suwon-si, Gyeonggi-do (KR)

(72) Inventors: Min-Ki Seo, Suwon-si (KR); Chang-Won Son, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/044,738

(22) Filed: Jul. 25, 2018

(65) Prior Publication Data
US 2019/0033928 A1    Jan. 31, 2019

(30) Foreign Application Priority Data
Jul. 25, 2017    (KR) .................. 10-2017-0094021

(51) Int. Cl.
*G06F 1/16*      (2006.01)
*H04W 52/24*   (2009.01)
(Continued)

(52) U.S. Cl.
CPC .......... *G06F 1/1698* (2013.01); *G06F 1/1643* (2013.01); *G06F 1/3234* (2013.01);
(Continued)

(58) Field of Classification Search
CPC combination set(s) only.
See application file for complete search history.

(56) References Cited

U.S. PATENT DOCUMENTS 8,793,519 B2 * 7/2014 Hong ................ G06F 1/1626
                                                           323/318
9,026,939 B2   5/2015 Smus
(Continued)

FOREIGN PATENT DOCUMENTS

WO         2015/034185      3/2016
WO      WO 2017/100754      6/2017

OTHER PUBLICATIONS

Search Report dated Oct. 17, 2018 in counterpart International Patent Application No. PCT/KR2018/008429.
(Continued)

*Primary Examiner* — Cindy Trandai
(74) *Attorney, Agent, or Firm* — Nixon & Vanderhye P.C.

(57) ABSTRACT

According to various embodiments, an electronic device may include a display disposed in a first housing, an input device comprising input circuitry disposed in a second housing arranged to face the display device, a first sensor module disposed in at least a portion of the first housing, a second sensor module disposed in at least a portion of the second housing, a communication module comprising communication circuitry, and a processor electrically connected with the display, the input device, the first sensor module and the second sensor module. The processor may be configured to determine whether sensing data received from the first sensor module and sensing data received from the second sensor module meet a predetermined condition, and to operate the input device in an external input mode if the sensing data provided by the first sensor and the sensing data provided by the second sensor meet the predetermined condition.

20 Claims, 11 Drawing Sheets

(51) Int. Cl.
   *H04W 52/50* (2009.01)
   *G06F 1/3234* (2019.01)
   *G06F 3/01* (2006.01)
   *G06F 3/0346* (2013.01)
   *H04W 4/80* (2018.01)
   *H04W 84/18* (2009.01)
   *H04W 52/02* (2009.01)

(52) U.S. Cl.
   CPC ............ *G06F 3/016* (2013.01); *G06F 3/0346* (2013.01); *H04W 52/242* (2013.01); *H04W 52/50* (2013.01); *H04W 4/80* (2018.02); *H04W 52/027* (2013.01); *H04W 52/0254* (2013.01); *H04W 52/0274* (2013.01); *H04W 84/18* (2013.01)

(56) References Cited

U.S. PATENT DOCUMENTS

| | | | | |
|---|---|---|---|---|
| 9,298,296 | B2* | 3/2016 | Park | G06F 1/1677 |
| 9,684,342 | B2* | 6/2017 | Kim | G06F 1/1616 |
| 10,095,277 | B2* | 10/2018 | Kang | G06F 1/1694 |
| 2004/0130176 | A1* | 7/2004 | Reichert | B60N 2/06 296/65.13 |
| 2009/0254037 | A1* | 10/2009 | Bryant, Jr. | A61M 5/142 604/151 |
| 2010/0093280 | A1 | 4/2010 | Ahn et al. | |
| 2010/0105443 | A1* | 4/2010 | Vaisanen | G06F 3/0486 455/566 |
| 2010/0182265 | A1* | 7/2010 | Kim | G06F 1/1616 345/173 |
| 2012/0072167 | A1* | 3/2012 | Cretella, Jr. | G06F 1/1626 702/150 |
| 2012/0299813 | A1* | 11/2012 | Kang | G06F 1/1641 345/156 |
| 2013/0205142 | A1* | 8/2013 | Jung | G06F 1/1677 713/300 |
| 2013/0342456 | A1* | 12/2013 | Choi | G06F 3/017 345/158 |
| 2013/0342759 | A1* | 12/2013 | Sahashi | H04N 5/268 348/460 |
| 2014/0049886 | A1* | 2/2014 | Lee | H02J 4/00 361/679.01 |
| 2015/0116364 | A1* | 4/2015 | Aurongzeb | G06F 3/0487 345/659 |
| 2015/0138120 | A1 | 4/2015 | Lee et al. | |
| 2015/0147970 | A1 | 5/2015 | Tan et al. | |
| 2015/0189177 | A1* | 7/2015 | Matsushima | H04N 5/23222 348/231.99 |
| 2015/0220299 | A1* | 8/2015 | Kim | G06F 3/0488 345/1.3 |
| 2015/0248959 | A1* | 9/2015 | Hamelinck | F16C 32/0465 335/229 |
| 2015/0362955 | A1* | 12/2015 | Hayashi | G06F 1/1677 360/6 |
| 2016/0103161 | A1* | 4/2016 | Drako | H02H 3/162 324/105 |
| 2016/0162099 | A1 | 6/2016 | Tseng et al. | |
| 2016/0342258 | A1 | 11/2016 | Han et al. | |
| 2017/0123460 | A1* | 5/2017 | Jung | G06F 1/1652 |
| 2017/0229100 | A1* | 8/2017 | Chun | G06F 1/1647 |
| 2017/0337025 | A1* | 11/2017 | Finnan | G06F 1/1654 |

OTHER PUBLICATIONS

Written Opinion dated Oct. 17, 2018 in counterpart International Patent Application No. PCT/KR2018/008429.
European Extended Search Report dated May 20, 2020 for EP Application No. 18837541.4.
Easyblue—Keyboard/Mouse Sharing Device, Zaram Technology; Blue Tooth V3.0 HiD Keyboard and Mouse Switch; Dec. 21, 2012; 6 pgs, http://zaram.com/product-easyblue/.

* cited by examiner

METHOD FOR UTILIZING INPUT DEVICE AND ELECTRONIC DEVICE FOR THE SAME

CROSS-REFERENCE TO RELATED APPLICATION

This application is based on and claims priority under 35 U.S.C. § 119 to a Korean patent application filed in the Korean Intellectual Property Office on Jul. 25, 2017, and assigned Serial No. 10-2017-0094021, the disclosure of which is incorporated by reference herein in its entirety.

BACKGROUND

1. Field

The present disclosure relates to a method and apparatus for utilizing an input device.

2. Description of Related Art

Recently, with the development of digital technologies, various types of electronic devices such as a mobile communication terminal, a Personal Digital Assistant (PDA), an electronic organizer, a smart phone, a tablet Personal Computer (PC), a wearable device, or the like are widely used. The electronic device is persistently improved in a hardware part and/or software part of the electronic device to support and enhance functions.

The electronic device is being developed in such a manner that a display device and an input device can be separately used according to usability of a user.

For example, the user may use the electronic device in a laptop mode in which both the display device and the input device are used or a tablet mode in which only the display device is used by folding back the input device or by separating the display device from the input device. The input device may have no utilization if the user uses only the display device.

SUMMARY

Various embodiments of the disclosure may provide a method and apparatus for utilizing an input device of an electronic device as an input device of an external device, based on a state of the electronic device, in which the input device is folded from the display device.

According to various embodiments, an electronic device may include a display disposed in a first member (e.g., a housing), an input device comprising input circuitry disposed in a second member (e.g., a housing) arranged to face the display device, a first sensor module disposed in at least a portion of the first member, a second sensor module disposed in at least a portion of the second member, a communication module comprising communication circuitry, and a processor electrically connected with the display, the input device, the first sensor module and the second sensor module. The processor may be configured to determine whether sensing data provided by the first sensor module and sensing data provided by the second sensor module meet a predetermined condition, and to operate the input device in an external input mode if the sensing data provided by the first sensor module and the sensing data provided by the second sensor module meet the predetermined condition.

According to various embodiments, a method of operating an electronic device may include acquiring sensing data provided by a sensor module of the electronic device, determining whether the sensing data meet a predetermined condition, and operating an input device of the electronic device in an external input mode if the sensing data meet the predetermined condition.

According to various embodiments, an input device of an electronic device, in which the input device is folded from a display device, is utilized as an input device of an external device, thereby increasing usability of the input device.

According to various embodiments, an input device of an electronic device can be utilized as a Bluetooth input device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
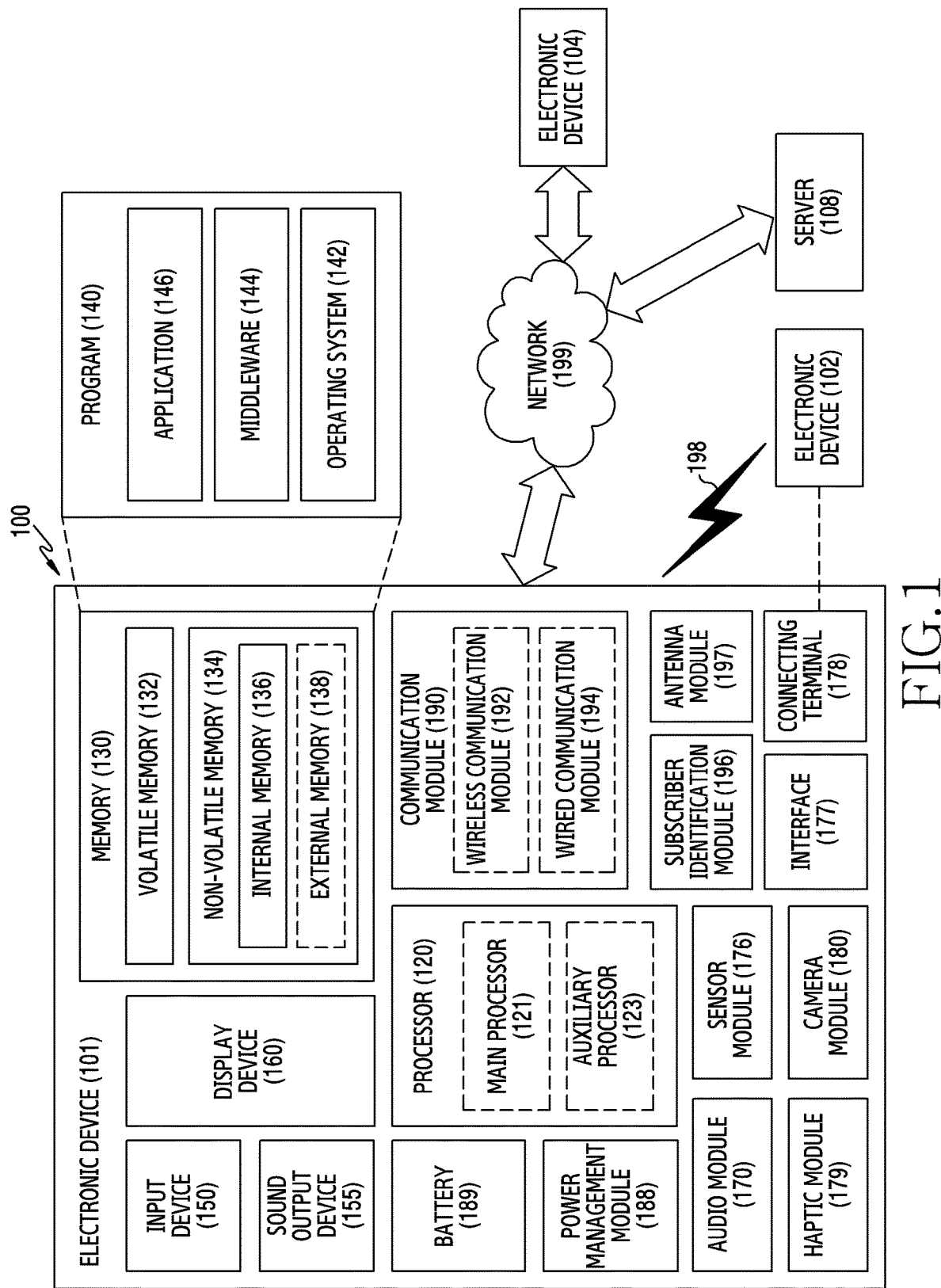
FIG. 1 is a block diagram illustrating an electronic device in a network environment according to various embodiments.

Hereinafter, various example embodiments of the present disclosure will be described with reference to the accompanying drawings. It should be appreciated that various embodiments of the present disclosure and the terms used therein are not intended to limit the technological features set forth herein to particular embodiments and include various modifications, equivalents, and/or alternatives for a corresponding embodiment. With regard to the description of the drawings, similar reference numerals may be used to refer to similar or related elements. The embodiments disclosed herein will presented for explanation and understanding, the technical disclosure, and are not intended to limit the scope of the disclosure. Accordingly, the scope of the disclosure should be understood to include all the changes, or various other embodiments based on the technical concept of the present disclosure.

FIG. 1 is a block diagram illustrating an electronic device 101 in a network environment 100 according to various embodiments of the present disclosure.

Referring to FIG. 1, the electronic device 101 in the network environment 100 may communicate with an electronic device 102 via a first network 198 (e.g., a short-range wireless communication network), and/or an electronic device 104 and/or a server 108 via a second network 199 (e.g., a long-range wireless communication network). According to an embodiment, the electronic device 101 may communicate with the electronic device 104 via the server 108. According to an embodiment, the electronic device 101 may include a processor (e.g., including processing circuitry) 120, memory 130, an input device (e.g., including input circuitry) 150, a sound output device (e.g., including sound output circuitry) 155, a display device 160, an audio module (e.g., including audio circuitry) 170, a sensor module 176, an interface (e.g., including interface circuitry) 177, a haptic module (e.g., including haptic circuitry) 179, a camera module 180, a power management module 188, a battery 189, a communication module (e.g., including communication circuitry) 190, a subscriber identification module (SIM) 196, and an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may include various processing circuitry and execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include various processing circuitry, such as, for example, and without limitation, a main processor 121 (e.g., a central processing unit (CPU) and/or an application processor (AP)), and an auxiliary processor 123 (e.g., a graphics processing unit (GPU), an image signal processor (ISP), a sensor hub processor, and/or a communication processor (CP)), or the like, that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as embedded in the main processor 121.

In this case, the auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 and/or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, and/or an application 146.

The input device 150 may receive a command or data to be used by other component (e.g., the processor 120) of the electronic device 101, from the outside (e.g., a user) of the electronic device 101. The input device 150 may include various input circuitry, such as, for example, and without limitation, a microphone, a mouse, and/or a keyboard, or the like.

The sound output device 155 may include various sound output circuitry and output sound signals to the outside of the electronic device 101. The sound output device 155 may include various sound output circuitry, such as, for example, and without limitation, a speaker and/or a receiver, or the like. The speaker may be used for general purposes, such as playing multimedia or playing record, and the receiver may be used for incoming calls. According to an embodiment, the receiver may be implemented as separate from, or as part of the speaker.

The display device 160 may visually provide information to the user of the electronic device 101. The display device 160 may include, for example, and without limitation, a display, a hologram device, and/or a projector, or the like, and control circuitry to control a corresponding device. According to an embodiment, the display device 160 may include touch circuitry and/or a pressure sensor adapted to measure the intensity of force incurred by a touch.

The audio module 170 may include various audio circuitry and convert a sound into an electrical signal and vice versa. According to an embodiment, the audio module 170 may obtain the sound via the input device 150, or output the sound via the sound output device 155 and/or an external electronic device (e.g., the electronic device 102) in a wired manner and/or wirelessly coupled with the electronic device 101.

The sensor module 176 may generate an electrical signal or data value corresponding to an operational state (e.g., power or temperature) of the electronic device 101 or an environmental state external to the electronic device 101. The sensor module 176 may include, for example, and without limitation, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor, or the like.

The interface 177 may support a specified protocol to be coupled with the external electronic device (e.g., the electronic device 102) in a wired manner or wirelessly. According to an embodiment, the interface 177 may include various interface circuitry, such as, for example, and without limitation, a high definition multimedia interface (HDMI), a universal serial bus (USB) interface, a secure digital (SD) card interface, and/or an audio interface, or the like.

A connecting terminal 178 may include a connector via which the electronic device 101 may be physically connected with the external electronic device (e.g., the electronic device 102), for example, a HDMI connector, a USB connector, a SD card connector, or an audio connector (e.g., a headphone connector).

The haptic module 179 may include various haptic circuitry and convert an electrical signal into a mechanical stimulus (e.g., a vibration or a movement) or electrical stimulus which may be recognized by a user via his tactile sensation or kinesthetic sensation. The haptic module 179 may include various haptic circuitry, such as, for example, and without limitation, a motor, a piezoelectric element, and/or an electric stimulator, or the like.

The camera module 180 may capture a still image or moving images. According to an embodiment, the camera module 180 may include one or more lenses, image sensors, image signal processors, or flashes.

The power management module 188 may manage power supplied to the electronic device 101, and may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may include various communication circuitry and support establishing a wired or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a wired or wireless communication. According to an embodiment, the communication module 190 may include various communication circuitry implemented in a variety of communication modules, such as, for example, and without limitation, a wireless communication module 192 (e.g., a cellular communication module, a short-range wireless communication module, and/or a global navigation satellite system (GNSS) communication module) and/or a wired communication module 194 (e.g., a local area network (LAN) communication module and/or a power line communication (PLC) module), or the like. A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, and/or a computer network (e.g., LAN or wide area network (WAN)), or the like. These various types of communication modules 190 may be implemented as a single component (e.g., a single chip), or may be implemented as multi chips separate from each other.

According to an embodiment, the wireless communication module 192 may identify and authenticate the electronic device 101 in a communication network, using user information stored in the subscriber identification module 196.

The antenna module 197 may include one or more antennas to transmit or receive a signal or power to or from the outside. According to an embodiment, the communication module 190 (e.g., the wireless communication module 192) may transmit or receive a signal to or from the external electronic device through an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101.

According to an embodiment, all or some of operations to be executed at the electronic device 101 may be executed at one or more of the external electronic devices. According to an embodiment, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
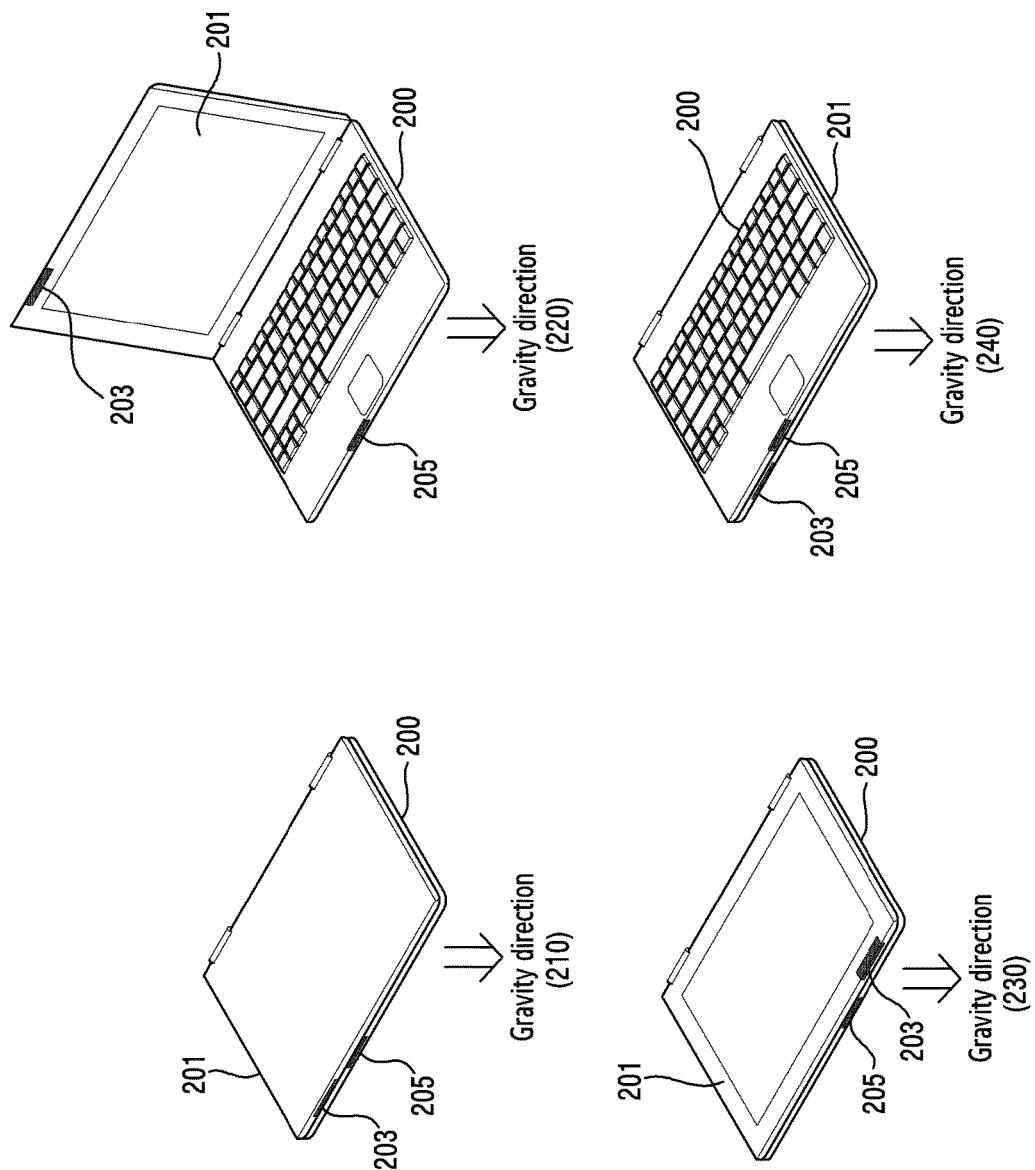
FIG. 2 is a diagram illustrating a shape in which an electronic device is folded according to various embodiments.

FIG. 2 is a diagram illustrating examples of a shape in which an electronic device is folded according to various embodiments.

Referring to FIG. 2, an electronic device (e.g., the electronic device 101) may have a shape in which an input device 200 (e.g., the input device 150) is folded from a display device 201 (e.g., the display device 160). Herein, a hinge connecting portion may be disposed between the display device 201 and the input device 200. In the electronic device 101, the input device 200 may be folded in a front side (e.g., a region having a display side) or a rear side (e.g., a region not having the display side) of the display device 201 via the hinge connecting portion. The display device 201 of the electronic device 101 may, for example, rotate by 360 degrees relative to the input device 200 via the hinge connecting portion.

The electronic device 101 may be folded such that the display side of the display device 201 faces an input side of the input device 200, or the input side of the input device 200 is folded back to the display side of the display device 201 (or the display side of the display device 201 is folded back to the input side of the input device 200). In other words, when the electronic device 101 is folded, the display side of the display device 201 and the input side of the input device 200 may face each other, or face the opposite directions, e.g., backing to each other. The electronic device 101 according to various embodiments may have the display device 201 including a first sensor module 203 disposed in at least a portion (e.g., a right lateral side or the like of a first member, e.g., first housing) in which the display device 201 is included, and a second sensor module 205 disposed in at least a portion of a second member (e.g., a second housing) in which the input device 200 is included. Although the first sensor module 203 and the second sensor module 205 are described hereinafter for example as an acceleration sensor to facilitate understanding of the present disclosure, the sensor module is not limited to the acceleration sensor in the description.

A first folding state 210 may be a state in which the display side of the display device 201 and the input side (e.g., a side having a keypad) of the input device 200 are folded to face each other. For example, the first folding state 210 may be a state in which a user does not use the electronic device 101. For example, the user may place the input device 200 of the electronic device 101 to face a bottom (e.g., a desk), and thereafter may fold the display device 201 in a direction of the input device 200. Since the display side of the display device 201 faces a gravity direction (e.g., a bottom, a lower side), a Y-axis of sensing data (or a sensor value) measured in the first sensor module 203 included in the display device 201 may have a negative value or a value similar to acceleration of gravity. In addition, since the input side of the input device 200 faces a direction (e.g., a sky direction, an upper side) opposite to the gravity direction, a Y-axis of sensing data measured in the second sensor module 205 included in the input device 200 may have a positive value.

A second folding state 220 may be a state in which the display side of the display device 201 and the input side of the input device 200 are arranged to have a specific angle (e.g., 90 degrees) therebetween. For example, the second folding state 220 may be arranged when the user uses the electronic device 101. In this case, the electronic device 101 may display a user feedback in the display device 201 based on a signal (e.g., a user input) detected by the input device 200. For example, when the user selects one key (e.g., an alphabet 'a') in the input device 200 in a state in which a word file is displayed in the display device 201, a character corresponding to the key may be input to an input field included in the word file. In the second folding state 220, an angle between the display device 201 and the input device 200 may differ depending on a user's selection. Since the display side of the display device 201 faces a direction (e.g., a horizontal direction) perpendicular to the gravity direction, a Y-axis of sensing data measured in the first sensor module 203 included in the display device 201 may have a negative value. For example, Y-axis sensing data detected in the second folding state 220 may be less than or equal to Y-axis sensing data of the first folding state 210. In addition, since the input side of the input device 200 faces a direction opposite to the gravity direction, the Y-axis of the sensing data measured in the second sensor module 205 included in the input device 200 may have a positive value.

A third folding state 230 may be a state in which the input device 200 is folded back to the display side of the display device 201. In other words, in the third folding state, the display side of the display device 201 and the input side of the input device 200 may face the opposite directions with backing each other. The third folding state 230 may be a state in which the display side of the display device 201 faces upwards (e.g., a sky direction), and the input side of the input device 200 faces a bottom (e.g., a lower direction). For example, the third folding state 230 may be a state in which the user uses only the display device 201 of the electronic device 101 and does not use the input device 200. In this case, the display device 201 may operate in a mode (e.g., a tablet mode) in which a display function and an input function can be performed simultaneously. Since the display side of the display device 201 faces a direction opposite to the gravity direction, the Y-axis of the sensing data measured in the first sensor module 203 included in the display device 201 may have a positive value. In addition, since the input side of the input device 200 faces the gravity direction, a Y-axis of sensing data measured in the second sensor module 205 included in the input device 200 may have a negative value or a value similar to acceleration of gravity.

A fourth folding state 240 may be a state in which the input device 200 is folded back to the display side of the display device 201. In other words, in the fourth folding state, the display side of the display device 201 and the input side of the input device 200 may face the opposite directions with backing each other. For example, the fourth folding state 240 may be a state in which the display side of the display device 201 faces a bottom (e.g., a lower direction), and the input side of the input device 200 faces upwards (e.g., a sky direction). The fourth folding state 240 may be a state in which the electronic device 101 of the third folding state 230 is reversed in an opposite direction (e.g., a 180-degree rotation). The fourth folding state 240 may be a state in which the user uses only the input device 200 of the electronic device 101 and does not use the display device 201. In this case, the input device 200 may be used as an input device of an external device (e.g., the electronic device 102, the electronic device 104) connected with the electronic device 101. Since the display side of the display device 201 faces the gravity direction, the Y-axis of the sensing data measured in the first sensor module 203 included in the display device 201 may have a negative value or a value similar to acceleration of gravity. In addition, since the input side of the input device 200 faces a direction opposite to the gravity direction, a Y-axis of sensing data measured in the second sensor module 205 included in the input device 200 may have a positive value.

The electronic device 101 according to various embodiments may determine a folding state (e.g., the first folding state 210 to the fourth folding state 240) of the electronic device by using sensing data measured in the first sensor module 203 included in the display device 201 and the second sensor module 205 included in the input device 200.

Figure 3:
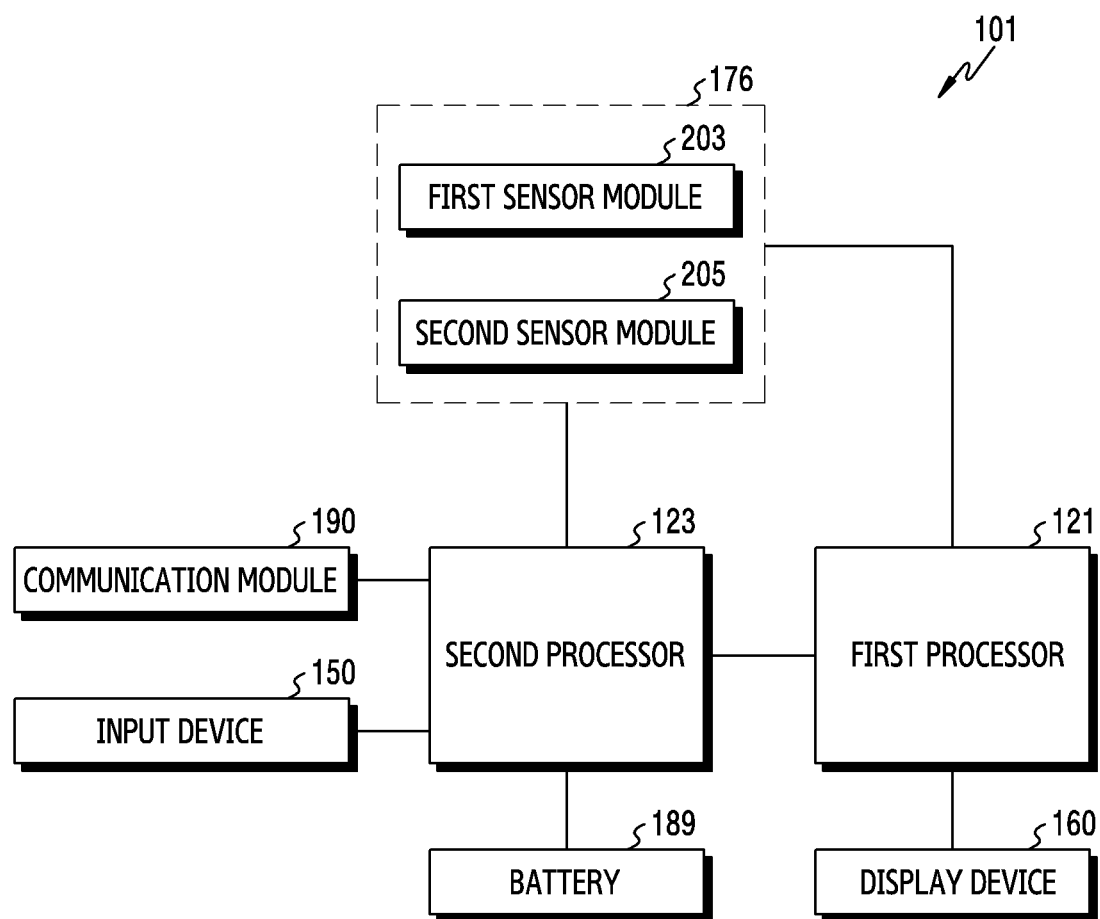
FIG. 3 is a block diagram illustrating a structure of an electronic device according to various embodiments.

FIG. 3 is a block diagram illustrating a structure of an electronic device according to various embodiments.

Referring to FIG. 3, an electronic device (e.g., the electronic device 101) may include a first processor (e.g., the main processor 121, e.g., including processing circuitry), a second processor (e.g., the coprocessor 123, e.g., including processing circuitry), the input device (e.g., including input circuitry) 150 (e.g., the input device 200), the display device 160 (e.g., the display device 201), the sensor module 176, the battery 189, and the communication module (e.g., including communication circuitry) 190. Since components of FIG. 2 are not essential components, the electronic device 101 according to various embodiments may be implemented with components more or less than those of FIG. 2.

The electronic device 101 may have a shape in which the input device 150 is folded from the display device 160. The display device 160 may be disposed in a first member, and the input device 150 may be disposed in a second member facing the first member. Herein, a hinge connection portion may be disposed between the first member and the second member, so that the first member and the second member are folded back and forth via the hinge connection portion. For example, it may be folded such that a front side of the first member and a front side of the second member face each other (e.g., the first folding state 210) and such that a back side of the first member and a back side of the second member face each other (e.g., the third folding state 230 and the fourth folding state 240).

As a main processor, the first processor 121 may include various processing circuitry, such as, for example, and without limitation, a dedicated processor, a Central Processing Unit (CPU), or the like. The first processor 121 may optionally operate in a selective manner. For example, if the electronic device 101 is turned on, the first processor 121 may operate in an active state (e.g., an operational mode). In addition, if a user input is not detected for a specific time duration (e.g., 5 minutes, 10 minutes, etc.), the first processor 121 may turn off the display device 160, and may be switched from the operational mode to a sleep mode (or a low-power mode). For example, if a key signal or a touch signal is not detected by the input device 160 for a specific time duration or if a touch signal is not detected by the display device 160, the first processor 121 may operate in an inactive state (e.g., a sleep mode). The first processor 121 may maintain the active state even if the user input is not detected according to an application (e.g., video) to be executed. While operating in the inactive state (e.g., the sleep mode), the first processor 121 may wake up periodically or according to at least one of a predetermined scan period and an operation period of an application (or an information request of the application) to operate in the active state.

As a coprocessor (or a low-power processor), the second processor 123 may include various processing circuitry, such as, for example, and without limitation, a microcomputer, a microprocessor, and/or a Micro Control Unit (MCU), or the like. The second processor 123 may, for example, operate with power lower than that of the first processor 121, and may maintain an operational state (e.g., an active state, an operational mode). The second processor 123 may wake up to receive sensing data from the sensor module 176. The second processor 123 may be in a wakeup state irrespective of whether the display device 160 is turned on/off. The second processor 123 may determine the operational mode of the input device 150 based on the sensing data. The second processor 123 may deliver the determination result (e.g., the sensing data, the operational mode) to the first processor 121.

The second processor 123 may control the operational mode of the input device 150. For example, the second processor 123 may allow the input device 150 to operate in a normal input mode or an external input mode. The normal input mode may be a mode in which an input signal (e.g., a key signal or a touch signal) detected in the input device 150 while the first processor 121 is active (e.g., the operational mode) is delivered to the first processor 121. Upon delivering the input signal detected in the input device 150, the first processor 121 may provide a feedback (e.g., inputting of a character or performing of a function) based on the detected input signal. The external input mode may be a mode in which the input signal detected in the input device 150 while the first processor 121 is inactive (e.g., the sleep mode) is delivered to the communication module 190. Upon delivering the input signal detected in the input device 150, a second electronic device (e.g., the electronic device 120) connected with the electronic device 101 may provide a feedback (e.g., inputting of a character or performing of a function) to a display unit of the second electronic device based on the detected input signal. The second processor 123 may be provided with power from a battery 189 while operating in the external input mode.

The input device 150 may include various input circuitry, such as, for example, and without limitation, a keyboard and/or a touch pad, or the like, as a device for receiving a command or data to be used in a component (e.g., the first processor 121, the second processor 123) of the electronic device 101.

The display device 160 may include, for example, and without limitation, a display, a control circuitry for controlling the display, and/or a touch circuitry, or the like, as a device for providing information to the user in a visual manner.

The sensor module 176 may, for example, and without limitation, generate an electronic signal and/or data value corresponding to an internal operational state (e.g., power or temperature) or external environment state of the electronic device 101. The sensor module 176 may include the first sensor module 203 and the second sensor module 205. The first sensor module 203 may be disposed in at least a portion of a first member (e.g., a first housing) having the display device 160 mounted thereon, and the second sensor module 205 may be disposed in at least a portion of a second member (e.g., a second housing) having the input device 150 mounted thereon. The first sensor module 203 and the second sensor module 205 may, or may not, be arranged to face each other. For example, the first sensor module 203 and the second sensor module 205 may include, without limitation, a gyro sensor, a proximity sensor, a grip sensor, an acceleration sensor, a hinge angle sensor, a hinge rotation sensor, or the like.

The communication module 190 may include various communication circuitry to support establishment of a wired or wireless communication channel between the electronic device 101 and an external device (e.g., the electronic device 102, the electronic device 104, or the server 108), and/or communication performed through the established communication channel. For example, when the input device 150 operates in an external input mode, the communication module 190 may transmit a user input signal (e.g., a key signal or a touch signal), detected by the input device 150, to an external device (e.g., the electronic device 102, the electronic device 104) connected with the electronic device 101. The communication module 190 may transmit the user input signal to the external device by using a short-distance communication network such as Bluetooth, WiFi direct, or IrDA.

An electronic device (e.g., the electronic device 101) according to various embodiments may include a display device (e.g., the display device 160, the display device 201) disposed in a first member (e.g., a housing), an input device (e.g., the input device 150, the input device 200) comprising input circuitry disposed in a second member (e.g., a housing) and arranged to face the display device, a first sensor module (e.g., the first sensor module 209) disposed in at least a portion of the first member, a second sensor module (e.g., the second sensor module 205) disposed in at least a portion of the second member, a communication module (communication module 190), and a processor (e.g., the coprocessor 123, the second processor 123) electrically connected with the display device, the input device, the first sensor module, and the second sensor module. The processor may be configured to determine whether sensing data measured by the first sensor module and the second sensor module meet a predetermined condition, and to operate the input device in an external input mode if the sensing data meet the predetermined condition.

The processor may be configured to transmit a user input signal detected (received) by the input device to the communication module if the input device operates in the external input mode.

The processor may be configured to switch a transmission path of a user input signal detected (received) by the input device from a first path to a second path if the input device is switched from a normal input mode to the external input mode.

The processor may be further configured to broadcast a connecting signal for pairing with an external device if the input device is switched from the normal input mode to the external input mode, and to connect to the external device that transmits a verification signal in response to the broadcasted connecting signal.

The communication module may be configured to transmit the user input signal detected (received) by the input device to the connected external device.

The processor may be further configured to turn off the electronic device if the verification signal from the external device is not received within a predetermined time duration.

The electronic device 101 may further include a main processor (e.g., the main processor 121, the first processor 121). The processor may be configured to transmit a user input signal detected (received) by the input device to the main processor if the input device operates in a normal input mode.

The main processor may be configured to turn off the display device and to operate in a sleep mode, while the input device is operating in the external input mode.

The main processor may be configured to, if a request to turn off power is received, determine whether an automatic input mode switching is set, and if the automatic input mode switching is set, operate in a sleep mode. The processor may be further configured to, based on whether the sensing data meet the predetermined condition, operate the input device in the external input mode.

The main processor may be further configured to, if the automatic input mode switching is not set, turn off the electronic device.

The processor may be configured to, if a user input detected (received) in turn-off state is a request for the external input mode, operate the input device in the external input mode.

The processor may be configured to, if a switching to the external input mode is requested in turn-on state, operate the input device in the external input mode.

Figure 4:
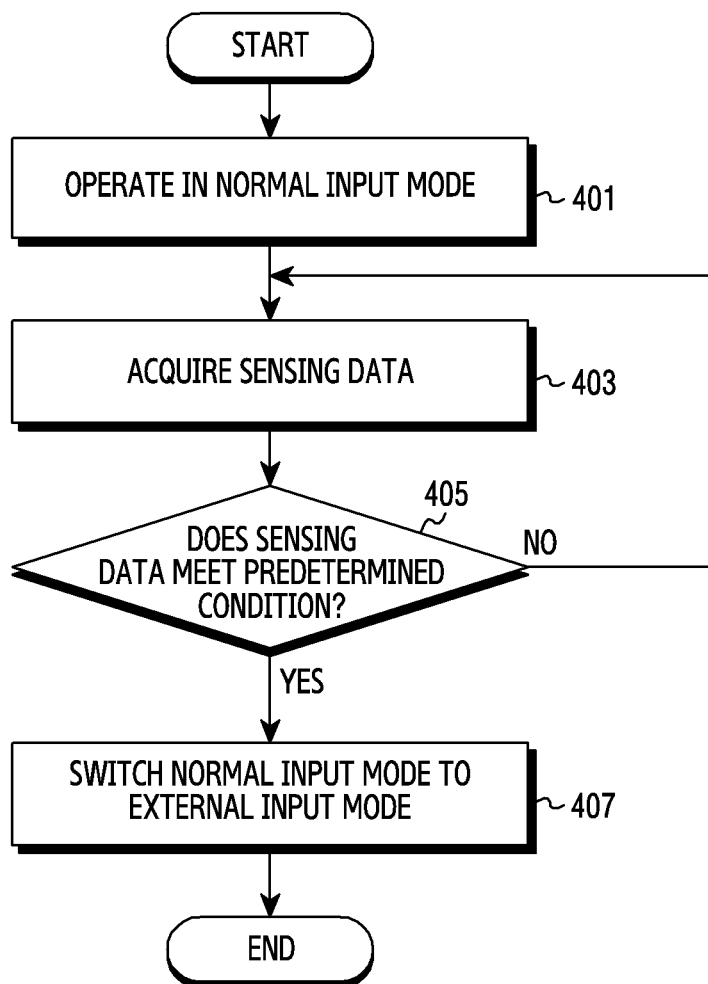
FIG. 4 is a flowchart illustrating a method of utilizing an input device of an electronic device according to various embodiments.

FIG. 4 is a flowchart illustrating a method of utilizing an input device of an electronic device according to various embodiments.

Referring to FIG. 4, in operation 401, a processor (e.g., the second processor 123) of an electronic device (e.g., the electronic device 101) may allow an input device (e.g., the input device 150) to operate in a normal input mode. The normal input mode may be a mode in which a user input signal detected by the input device 150 is internally used. In the normal input mode, a first processor (e.g., the first processor 121) may perform a function corresponding to the user input signal detected by the input device 150. The second processor 123 may deliver the user input signal (e.g., a key signal or a touch signal) detected by the input device 150 to the first processor 121. The first processor 121 may provide a feedback (e.g., a character input corresponding to a user input signal) to a display device (e.g., the display device 160) based on the input signal. While operating in the normal input mode, both the first processor 121 and the second processor 123 may be in an active state (e.g., an operational mode).

In operation 403, the second processor 123 of the electronic device 101 may acquire sensing data. The sensing data may include, for example, first sensing data acquired from a first sensor module (e.g., the first sensor module 203) disposed in at least a portion of a first member having the display device 160 mounted thereon and second sensing data acquired from a second sensor module (e.g., the second sensor module 205) disposed in at least a portion of a second member having the input device 150 mounted thereon. For example, the second processor 123 may determine a folding state (e.g., the first folding state 210 to the fourth folding state 240) of the electronic device 101 based on the first sensing data and the second sensing data. In a state (e.g., the first folding state 210) of being folded such that a display side of the display device 201 and an input side (e.g., a side having a keypad) of the input device 200 face each other, a Y-axis of the first sensing data may have a negative value or a value similar to acceleration of gravity, and a Y-axis of the second sensing data may have a positive value. In a state (e.g., the second folding state 220) of being disposed such that the display side of the display device 201 and the input side of the input device 200 have a specific angle (e.g., 90 degrees) therebetween, the Y-axis of the first sensing data may have a negative value, and the Y-axis of the second sensing data may have a positive value.

In a state (e.g., the third folding state 230) in which the input device 200 is folded back to the display side of the display device 210, a Y-axis of the first sensing data may have a positive value, and a Y-axis of the second sensing data may have a negative value or a value similar to an acceleration value. In a state (e.g., the fourth folding state 240) in which the display device 201 is folded back to the input side of the input device 200, a Y-axis of the first sensing data may have a negative value or a value similar to acceleration of gravity, and a Y-axis of the second sensing data may have a positive value.

In operation 405, the second processor 123 of the electronic device 101 may determine whether the acquired sensing data meet a predetermined condition (e.g., a first condition). Herein, the predetermined condition may correspond to a condition for utilizing the input device 150 of the electronic device 101 as an input device of an external device. For example, the predetermined condition may be a state in which the display device 160 is folded back to an input side of the input device 150 (e.g., the fourth folding state 240). The second processor 123 may determine, from the acquired sensing data, whether the Y-axis of the first sensing data has a negative value or a value similar to acceleration of gravity and the Y-axis of the second sensing data has a positive value.

If the sensing data meet the predetermined condition, the second processor 123 may perform operation 407, and otherwise, may return to operation 403.

In operation 407, the second processor 123 of the electronic device 101 may switch the normal input mode of the input device (e.g., the input device 150) to the external input mode. The external input mode may be a mode in which a user input signal detected in the input device 150 is delivered to the outside via a communication module (e.g., the communication module 190) without using it internally in the electronic device 101. For this, the second processor 123 may switch a transmission path of the input device 150, broadcast a connecting signal for paring with an external device (e.g., the electronic device 102, the electronic device 104), connect to the external device that transmits a verification signal for the connecting signal, and transmit a user input signal detected by the input device 150 to the connected external device.

For example, if the input device 150 is switched to the external input mode, the first processor 121 may turn off a display device (e.g., the display device 160), and may become inactive (e.g., sleep mode or power off). While the first processor 121 operates in the sleep mode, the second processor 123 may deliver the input signal detected in the input device 150 to the communication module 190. When the input signal detected in the input device 150 is delivered to the communication module 190, the external device connected with the electronic device 101 may provide a feedback (e.g., inputting of a character or performing of a function) to a display unit of the external device based on the input signal.

Figure 5:
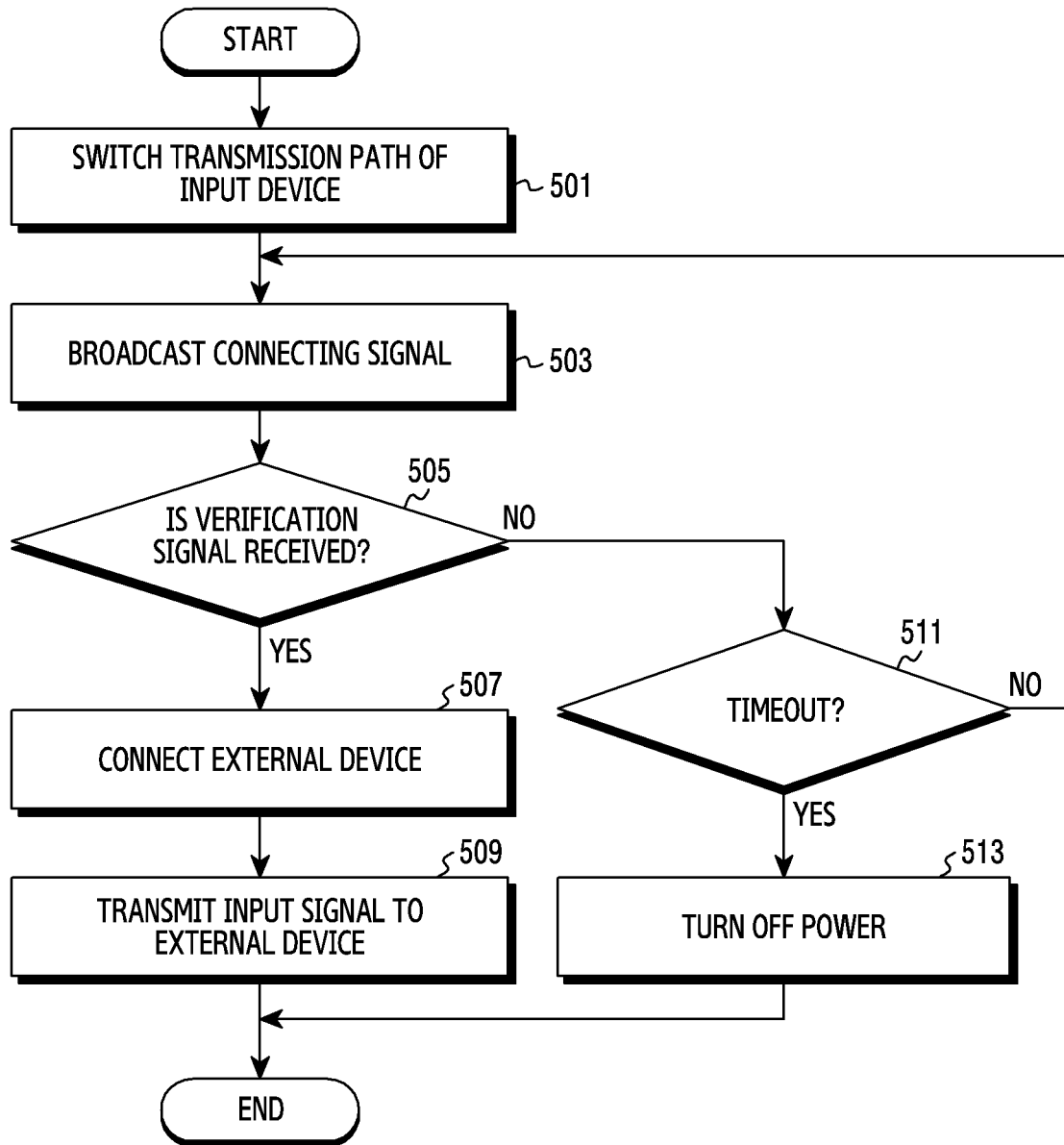
FIG. 5 is a flowchart illustrating a method of external input mode switching of an electronic device according to various embodiments.

FIG. 5 is a flowchart illustrating a method of external input mode switching of an electronic device according to various embodiments. Operation 407 of FIG. 4 is illustrated in greater detail with reference to FIG. 5.

Referring to FIG. 5, in operation 501, a processor (e.g., the second processor 123) of an electronic device (e.g., the electronic device 101) may switch a transmission path of an input device (e.g., the input device 150). For example, when the input device 150 operates in a normal input mode, the transmission path of the input device 150 may be set to a first transmission path to internally use a user input signal detected by the input device 150. Upon setting the first transmission path, a signal detected by the input device 150 may be delivered to a first processor (e.g., the first processor 121). For example, the first transmission path may correspond to a Low Pin Count (LPC) interface. When the input device 150 operates in an external input mode, the transmission path of the input device 150 may be set to a second transmission path to transmit the user input signal detected by the input device 150 to the outside. Upon setting of the second transmission path, a signal detected by the input device 150 may be delivered to a communication module (e.g., the communication module 190). For example, the second transmission path may correspond to a Universal Asynchronous Receiver Transmitter (UART) interface.

If an operational mode of the input device 150 is switched from a normal input mode to an external input mode, the second processor 123 may switch (change) the transmission path of the input device 150 from the first transmission path to the second transmission path.

In operation 503, the second processor 123 of the electronic device 101 may broadcast a connecting signal. The connecting signal may be a signal transmitted via the communication module 190 in order to be paired (or connected) with an external device. That is, the connecting signal may be a signal to be found by the external device to utilize the input device 150 as the input device of the external device. The connecting signal may be broadcasted in a short distance wireless communication scheme such as Bluetooth, WiFi direct, or IrDA.

In operation 505, the second processor 123 of the electronic device 101 may determine whether a verification signal is received. An external device that receives the broadcasted connecting signal may transmit the verification signal to the electronic device 101 to perform pairing with the electronic device 101.

The second processor 123 may perform operation 507 if the verification signal is received, and may perform operation 511 if the verification signal is not received.

Upon receiving the verification signal, in operation 507, the second processor 123 of the electronic device 101 may be connected with the external device that transmits the verification signal. For example, if the input device 150 is switched to the external input mode, the display device 160 of the electronic device 101 is turned off, and thus the electronic device 101 may not be able to verify information of the external device that transmits the verification signal. Upon receiving the verification signal from the external device which has previously connected with the electronic device 101, the second processor 123 according to various embodiments may allow the connection with the external device automatically. Alternatively, even if the external device has never been connected previously, the second processor 123 may allow the external device to be connected with the external device that transmits the verification signal. Alternatively, the second processor 123 may allow the connection with the external device which has first transmitted the verification signal. The second processor 123 according to various embodiments may omit operations 502 to 507 in the presence of the external device previously connected.

In operation 509, the second processor 123 of the electronic device 101 may transmit an input signal to the connected external device. For example, after being connected with the external device, the second processor 123 may detect (receive) an input signal from the input device 150 by a user's selection. The second processor 123 may allow the input signal to be delivered to the external device via the communication module 190 by delivering the detected input signal to the communication module 190. The input signal may be detected when at least one key is selected (or pressed) in a keyboard of the input device 150 or a touch occurs in a touch pad of the input device 150. Therefore, the input device 150 of the electronic device 101 may be utilized as the input device of the external device.

If the verification signal is not received, in operation 511, the second processor 123 of the electronic device 101 may determine whether a timeout occurs. An external input mode of the input device 150 may be a mode in which the first processor 121 operates in a sleep mode and only the second processor 123 is active. The electronic device 101 may set a time when operating in the external input mode, and thus may turn off power if the verification signal is not received from the external device within the set time. This may be for avoiding unnecessary waste of power. Therefore, the second processor 123 may count a time from when a connecting signal is broadcasted, and may determine whether the counted time exceeds the set time (e.g., 30 seconds, 1 minute, etc.). When the counted time exceeds the set time, the second processor 123 may determine that the timeout occurs.

If the timeout occurs, the second processor 123 may perform operation 513, and otherwise, may return to operation 503. Upon returning to operation 503, the second processor 123 may broadcast the connecting signal on a real-time basis and periodically, and may determine whether a verification signal is received in response to the connecting signal within the set time.

If the timeout occurs, in operation 513, the second processor 123 of the electronic device 101 may turn off the electronic device 101. If the electronic device 101 is turned off, both the first processor 121 and the second processor 123 may enter an inactive state.

Figure 6:
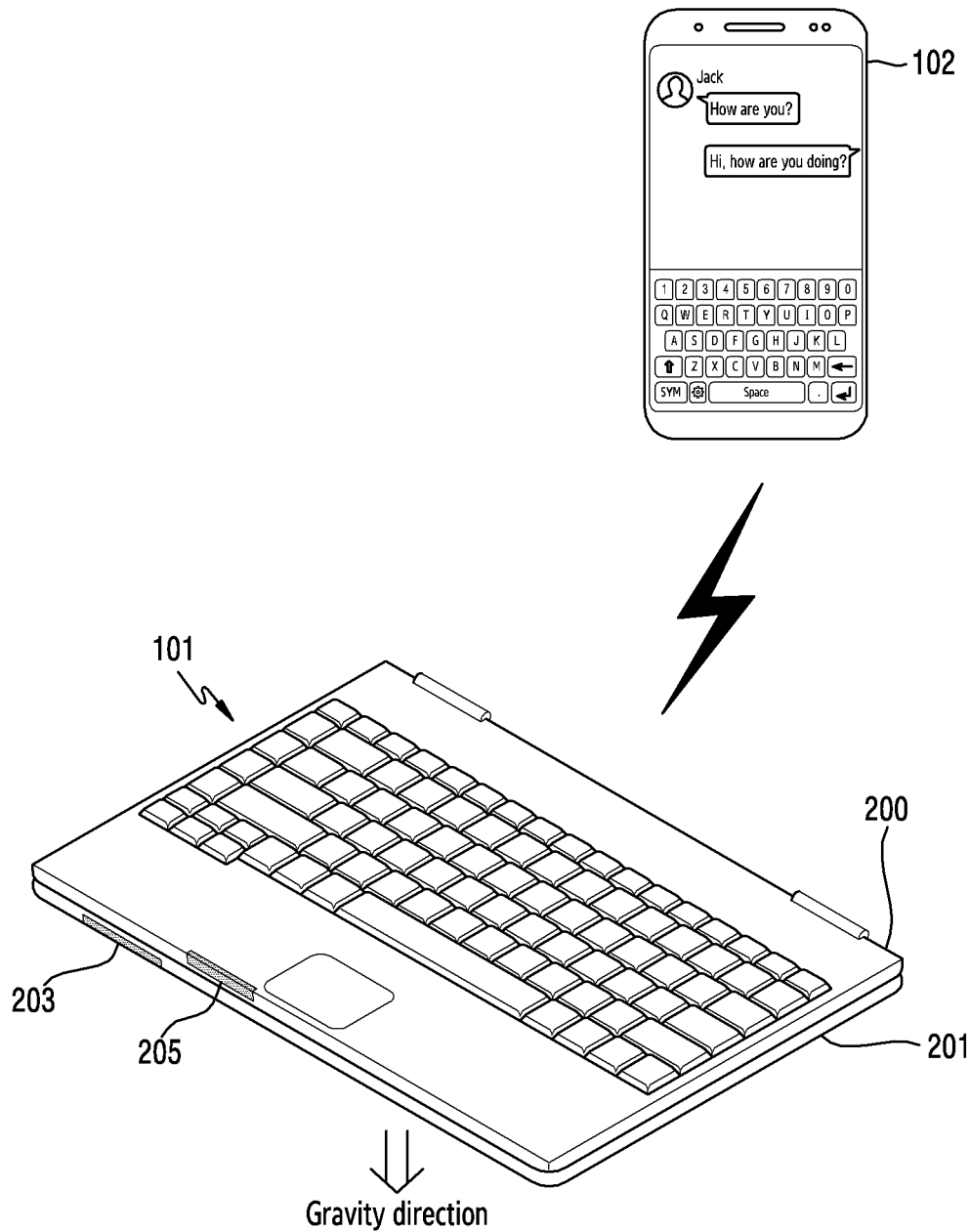
FIG. 6 is a diagram illustrating an example of utilizing an external input mode of an electronic device according to various embodiments.

FIG. 6 is a diagram illustrating an example of utilizing an external input mode of an electronic device according to various embodiments.

Referring to FIG. 6, an electronic device (e.g., the electronic device 101) in a state (e.g., the fourth folding state 240) in which the display device 201 (e.g., the display device 160) is folded back to an input side of the input device 200 (e.g., the input device 150) may operate in a low power mode. A second processor (e.g., the second processor 123) of the electronic device 101 may transmit a user input signal (e.g., a key signal, a touch signal) detected by the input device 200 to an external device (e.g., the second electronic device 102) via a communication module (e.g., the communication module 190). For example, the second electronic device 102 may input a character (e.g., "Hi, how are you doing?") to an input field of a display unit based on a key signal from the input device 200 of the electronic device 101. The second electronic device 102 according to various embodiments may display both the input field and the keypad to the display unit or may display only the input field except for the keypad, if it is connected with the electronic device 101. This is only an example implementation, and the configuration of the present disclosure is not limited to detailed descriptions and drawings.

Figure 7:
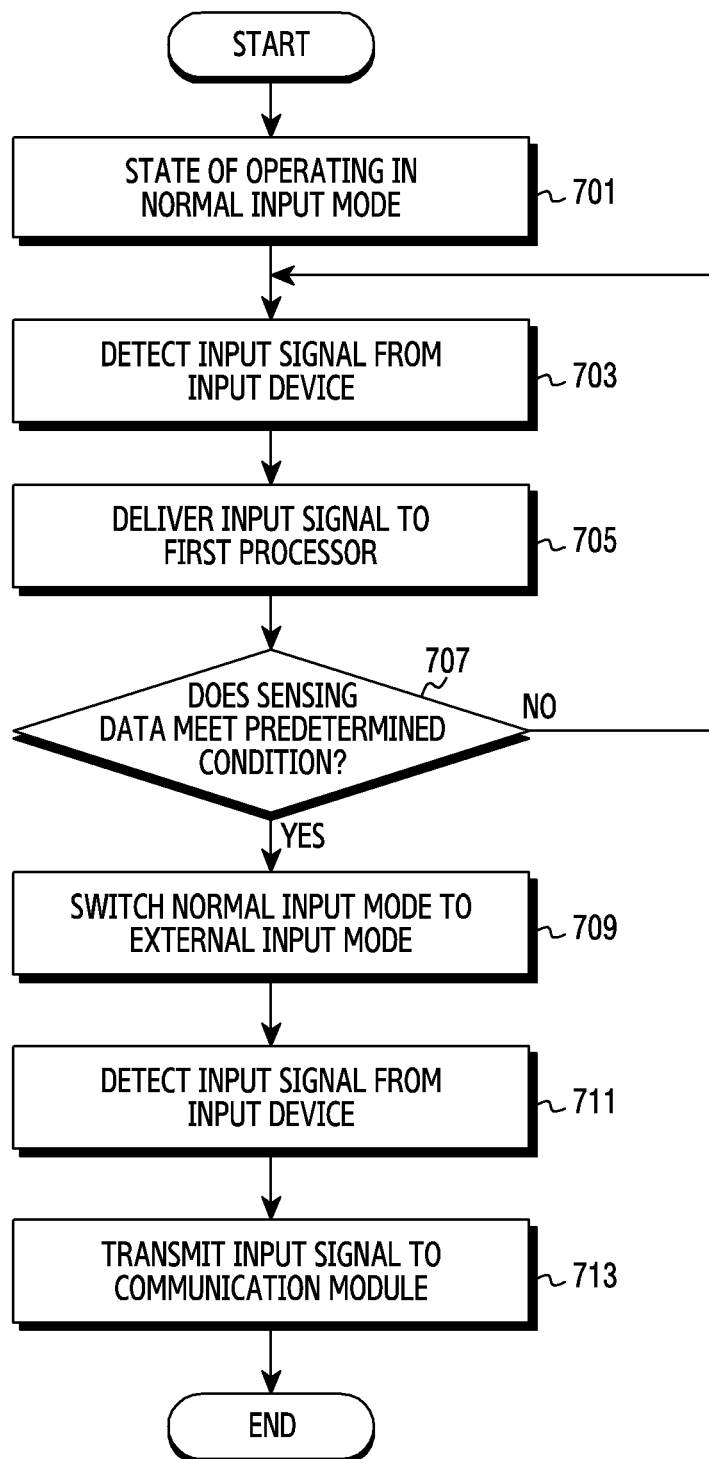
FIG. 7 is a flowchart illustrating a method of operating an electronic device according to various embodiments.

FIG. 7 is a flowchart illustrating a method of operating an electronic device according to various embodiments.

Referring to FIG. 7, in operation 701, a processor (e.g., the second processor 123) of an electronic device (e.g., the electronic device 101) may be in a state of operating in a normal input mode. The normal input mode may be a mode in which a user input signal detected by an input device (e.g., the input device 150) is internally used. The state of operating in the normal input mode may be a state in which the electronic device 101 is turned on to activate a first processor (e.g., the first processor 121 and the second processor 123). In this case, a transmission path of the input device 150 may be set to a first transmission path (e.g., LPC).

In operation 703, the second processor 123 of the electronic device 101 may detect an input signal from the input device. The input signal may be detected when at least one key is selected (or pressed) in a keyboard of the input device 150 or a touch occurs in a touch pad of the input device 150.

In operation 703, the second processor 123 of the electronic device 101 may deliver the input signal to the first processor 121. The first processor 121 may provide a feedback (e.g., a character input corresponding to a user input signal) to a display device (e.g., the display device 160) based on the input signal. For example, If the input signal is a touch signal, the first processor 121 may move a pointer (or a curser) displayed on the display device 160 according to the touch signal. If the input signal is a key signal, the first processor 121 may perform a function (e.g., a function corresponding to a character input or a key signal) based on the key signal.

In operation 707, the second processor 123 of the electronic device 101 may determine whether sensing data meet a predetermined condition. The second processor 123 may acquire the sensing data while operations 701 to 705 are performed. The second processor 123 may determine whether the display device 160 is in a state of being folded back to an input side of the input device 150 (e.g., the fourth folding state 240) based on the acquired sensing data. Since operation 707 is identical or similar to operation 405, detailed descriptions thereof may be omitted.

If the sensing data meet the predetermined condition, the second processor 123 may perform operation 709, and otherwise, may return to operation 703. Upon returning to operation 703, the second processor 123 may detect an input signal while operating in the normal input mode, and may deliver the detected input signal to the first processor 121.

If the sensing data meet the predetermined condition, in operation 709, the second processor 123 of the electronic device 101 may switch the normal input mode of the input device 150 to an external input mode. The external input mode may be a mode in which an input signal detected in the input device 150 is delivered to the outside via a communication module (e.g., the communication module 190) without using it internally in the electronic device 101. For example, the second processor 123 may perform operations of FIG. 5.

In operation 711, the second processor 123 of the electronic device 101 may detect (receive) an input signal from the input device. The input signal may be detected when at least one key is selected (or pressed) in a keyboard of the input device 150 or a touch occurs in a touch pad of the input device 150. Operation 711 may be identical or similar to operation 703.

In operation 713, the second processor 123 of the electronic device 101 may transmit the detected (received) input signal to the communication module 190. The second processor 123 may allow the input signal to be delivered to the connected external device via the communication module 190 by delivering the detected input signal to the communication module 190. The second processor 123 may repeatedly perform operations 711 and 713 based on a user's selection while in the external input mode.

Although the method of switching from the normal input mode to the external input mode is illustrated in FIG. 7, a method of switching from the external input mode to the normal input mode may also be similar to FIG. 7.

Figure 8:
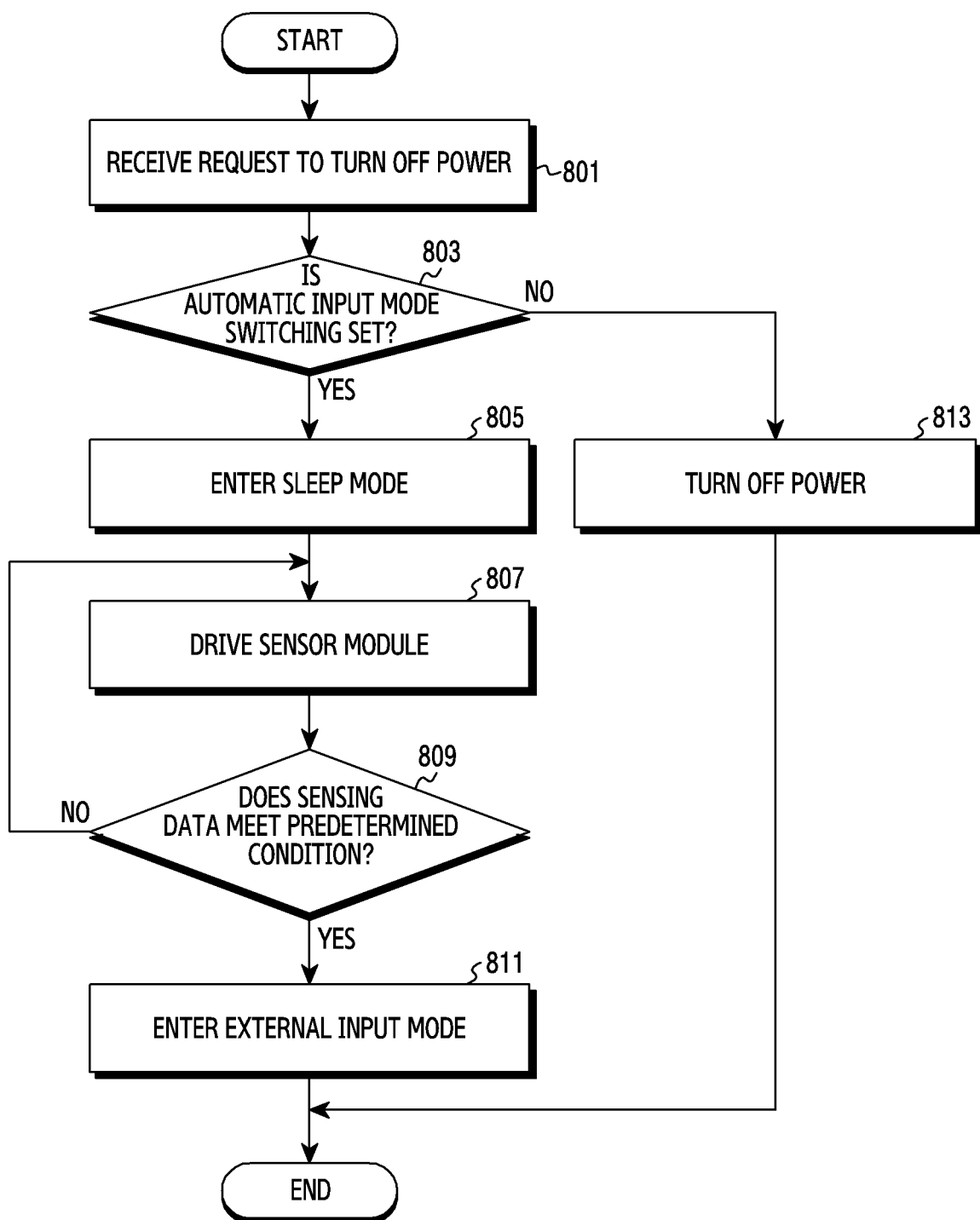
FIG. 8 is a flowchart illustrating a method of entering an external input mode when power is off according to various embodiments.

FIG. 8 is a flowchart illustrating a method of entering an external input mode when power is off according to various embodiments.

Referring to FIG. 8, in operation 801, a processor (e.g., the first processor 121) of an electronic device (e.g., the electronic device 101) may receive a request to turn off power. The request to turn off power may occur when a user selects a 'system end button' or select a 'power button'. When the electronic device 101 is turned on, since it is a state in which the first processor 121 operates, the first processor 121 may control the request to turn off power. Alternatively, according to an embodiment, a second processor (e.g., the second processor 123) may receive the request to turn off power from the first processor 121.

In operation 803, the first processor 121 of the electronic device 101 may determine whether automatic input mode switching is set. The automatic input mode switching may be an operation in which an input device (e.g., the input device 150) of the electronic device 101 is allowed to automatically operate in an external input mode when the electronic device 101 is turned off. The automatic input mode may be set by a user, or may be set by default in the electronic device 101. The first processor 121 may determine whether the automatic input mode switching is set in the electronic device 101 before the electronic device 101 is turned off due to the request to turn off power.

The first processor 121 may perform operation 805 if the automatic input mode switching is set, and may perform operation 813 if the automatic input mode switching is not set.

If the automatic input mode switching is not set, in operation 813, the first processor 121 of the electronic device 101 may turn off the electronic device 101. The first processor 121 may turn off the electronic device 101 according to the request to turn off power in operation 801.

If the automatic input mode switching is set, in operation 805, the first processor 121 of the electronic device 101 may enter a sleep mode. The first processor 121 may hand over a control to the second processor 123 to enter the sleep mode. Alternatively, the first processor 121 may indicate switching to an external input mode to the second processor 123, and may enter the sleep mode.

In operation 807, the second processor 123 of the electronic device 101 may drive a sensor module (e.g., the sensor module 176). The second processor 123 may acquire sensing data by driving the sensor module 176 while the first processor 121 operates in the sleep mode.

In operation 809, the second processor 123 of the electronic device 101 may determine whether sensing data meet a predetermined condition. For example, the predetermined condition may be a state in which the display device 160 is folded back to an input side of the input device 150 (e.g., the fourth folding state 240). The second processor 123 may determine, from the acquired sensing data, whether the Y-axis of the first sensing data has a negative value or a value similar to acceleration of gravity and the Y-axis of the second sensing data has a positive value.

If the sensing data meet the predetermined condition, the second processor 123 may perform operation 811, and otherwise, may return to operation 807.

In operation 811, the second processor 123 of the electronic device 101 may enter an external input mode. For example, the second processor 123 may control an input device (e.g., the input device 150) to switch from the normal input mode to the external input mode. For this, the second processor 123 may perform operations of FIG. 5. For example, the second processor 123 may switch a transmission path of the input device 150 (e.g., switching of a first transmission path to a second transmission path), broadcast a connecting signal, connect to an external device that transmits a verification signal in response to the connecting signal, and transmit a user input signal detected in the input device 150 to a connected external device.

The second processor 123 according to various embodiments may determine whether sensing data meet a predetermined condition upon receiving the request to turn off power from the first processor 121. If the sensing data meet the predetermined condition, the second processor 123 may determine that the automatic input mode switching is set. In this case, the second processor 123 may enter the external input mode by performing operation 811 instead of performing operations 805 to 809.

Figure 9:
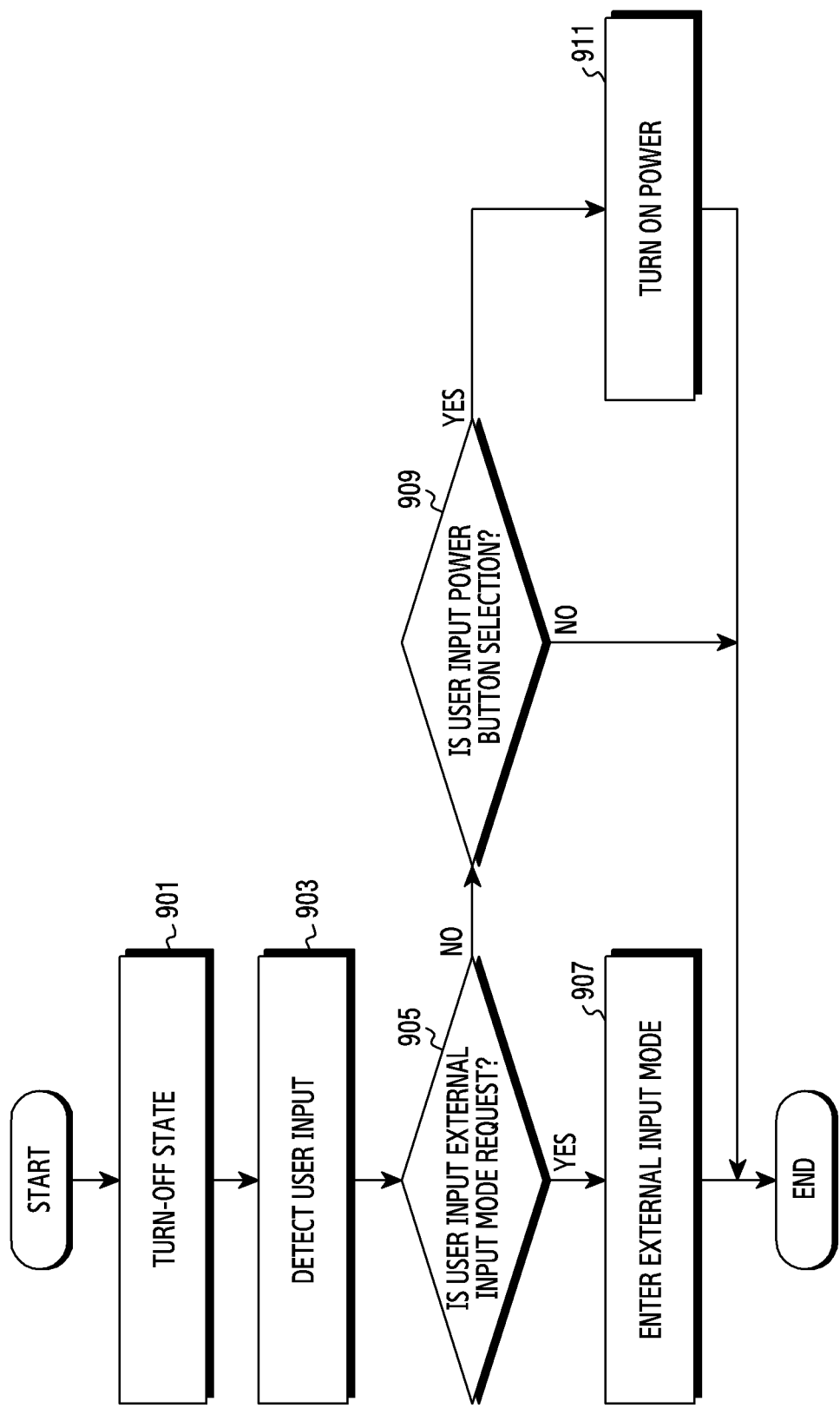
FIG. 9 is a flowchart illustrating a method of entering an external input mode of an electronic device according to various embodiments.

FIG. 9 is a flowchart illustrating a method of entering an external input mode of an electronic device according to various embodiments.

Referring to FIG. 9, in operation 901, an electronic device (e.g., the electronic device 101) may be in a turn-off state. The turn-off state may be a state in which both a first processor (e.g., the first processor 121) and second processor (e.g., the second processor 123) of the electronic device 101 are in an inactive state (e.g., a non-operational state or a sleep mode).

In operation 903, the first processor 121 of the electronic device 101 may detect (receive) a user input. The user input may be detected in an input device (e.g., the input device 150) or a display device (e.g., the display device 160) according to a user's selection.

In operation 905, the first processor 121 of the electronic device 101 may determine whether the detected user input is an external input mode request. In order to enter the external input mode from the turn-off state, a pre-agreed user input may be set in the electronic device 101. For example, upon selecting an "enter key" after selecting "i" from the input device 150 in the turn-off state, the first processor 121 may determine that the external input mode is requested. Alternatively, upon selecting a power button in a state in which the display device 160 is folded back to an input side of the input device 150 (e.g., the fourth folding state 240), the first processor 121 may determine that the external input mode is requested. Alternatively, similarly to the power button, an "external input button" for entering the external input mode may be provided in the input device 150. When the user selects the external input button, the first processor 121 may determine that the external input mode is requested.

The first processor 121 may perform operation 907 if the user input is the external input mode request, and may perform operation 909 if the user input is not the external input mode request.

If the user input is the external input mode request, in operation 907, the first processor 121 of the electronic device 101 may enter the external input mode. For example, the first processor 121 may hand over a control to the second processor 123, and may enter the sleep mode. Alternatively, the first processor 121 may indicate switching to an external input mode to the second processor 123, and may enter the sleep mode. The second processor 123 may control the input device 150 to operate in the external input mode. For example, the second processor 123 may perform operations of FIG. 5.

If the user input is not the external input mode, in operation 909, the first processor 121 of the electronic device (e.g., the electronic device 101) may determine whether the user input selects a power button. The power button may be provided in the input device 150 or the display device 160.

The first processor 121 may perform operation 911 if the user selects the power button, and may end the procedure if the user does not select the power button. For example, the first processor 121 may ignore the user input if the user input is detected by the input device 150 or the display device 160 in a turn-off state but is neither an external input mode request nor a power button selection. That is, the first processor 121 may ignore the user input and maintain the turn-off state.

If the user selects the power button, in operation 911, the first processor 121 of the electronic device 101 may turn on the electronic device 101. For example, the first processor 121 may boot the electronic device 101. Upon booting the electronic device 101, the input device 150 may operate in the normal input mode.

Although it is illustrated in FIG. 9 that operation 905 is performed first and then operation 909 is performed later, operations 905 and 909 may be performed simultaneously, or operation 909 may be performed first and then operation 905 may be performed later. This is for purposes of example only, and thus the present disclosure is not limited thereto.

Figure 10:
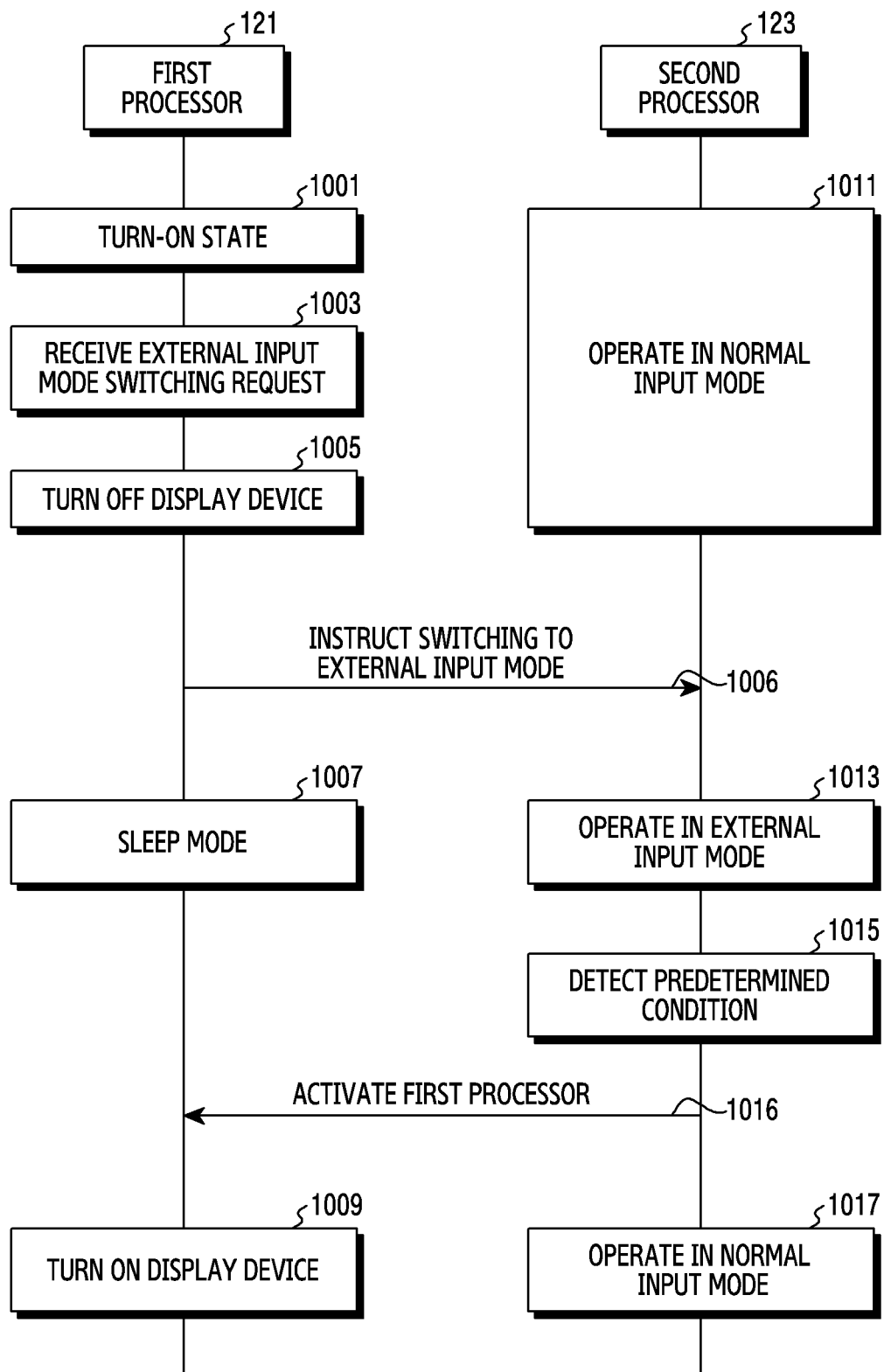
FIG. 10 is a flowchart illustrating an operation between a first processor and a second processor according to various embodiments.

FIG. 10 is a flowchart illustrating an operation between a first processor and a second processor according to various embodiments.

Referring to FIG. 10, in operation 1001, an electronic device (e.g., the electronic device 101) may be in a turn-on state. When power is applied to the electronic device 101, the first processor 121 may maintain an active state.

In operation 1003, the first processor 121 of the electronic device 101 may receive an external input mode switching request. The external input mode switching request may be for a folding state (e.g., the fourth folding state 240) in which a display side of a display device (e.g., the display device 160) faces a bottom and an input side of an input device (e.g., the input device 150) faces upwards. Alternatively, the external input mode switching request may be for a state in which the electronic device 101 maintains the fourth folding state 240 for a specific time duration (e.g., 5 minutes). Alternatively, upon receiving a predetermined input from a user or when a button for entering an external input mode (e.g., an external input button) is selected, the first processor 121 may determine that the external input mode switching is requested. When the predetermined input or the external input button is selected, the electronic device 101 may be in a state (e.g., the second folding state 220) in which the display side of the display device 160 and the input side of the input device 150 are arranged to have a specific angle (e.g., 150 degrees) therebetween.

The electronic device 101 according to various embodiments may enter an external input mode according to a configuration of the electronic device 101 even in a case (e.g., the second folding state 220) where sensing data does not meet a predetermined condition (e.g., the fourth folding state 240).

In operation 1005, the first processor 121 of the electronic device 101 may turn off the display device 160. The first processor 121 may prepare to enter a sleep mode when the external input mode switching is requested. First, the first processor 121 may turn off the display device 160 which is not used in the external input mode.

In operation 1011, the second processor 123 of the electronic device 101 may operate in a normal input mode. The second processor 123 may operate in the normal input mode while the first processor 121 performs operations 1001 to 1005. The second processor 123 may deliver an input signal, detected by the input device 150, to the first processor 121 while operating in the normal input mode.

In operation 1006, the first processor 121 of the electronic device 101 may instruct the second processor 123 to switch to the external input mode. Second, after turning off the display device 160, the first processor 121 may hand over a control to the second processor 123.

In operation 1013, the second processor 123 of the electronic device 101 may operate in the external input mode. The second processor 123 may be instructed from the first processor 121 to switch to the external input mode, and may allow the input device 150 to operate in the external input mode. For this, the second processor 123 may perform operations of FIG. 5. The second processor 123 according to various embodiments may omit operations 503 to 507 in the presence of the external device previously connected. While operating in the external input mode, the second processor 123 may deliver an input signal, detected by the input device 150, to a communication module (e.g., the communication module 190).

In operation 1007, the first processor 121 of the electronic device 101 may enter a sleep mode. After instructing the second processor 123 to switch to the external input mode, the first processor 121 may operate in the sleep mode. When the first processor 121 enters the sleep mode, the electronic device 101 may drive the external input mode with low power. The electronic device 101 may control the external input mode by using the second processor 123 with minimum power.

In operation 1015, the second processor 123 of the electronic device 101 may determine whether a predetermined condition (e.g., a second condition) is detected. The second condition may be for activating the first processor 121. For example, the second condition may be selection of a power button or selection of an external input button. Alternatively, the second condition may be a state (e.g., the third folding state 230) in which a display side of the display device 160 faces upwards (e.g., a sky direction), and the input side of the input device 150 faces a bottom (e.g., a lower direction). Alternatively, the second condition may be a state in which the electronic device 101 maintains the third folding state 230 for a specific time duration (e.g., 5 minutes).

In operation 1016, the second processor 123 of the electronic device 101 may activate the first processor 121 upon detecting the second condition. For example, upon detecting the second condition, the second processor 123 may allow the first processor 120 to wake up to drive the first processor 121.

In operation 1009, the first processor 121 of the electronic device 101 may turn on the display device 160 by turning on power.

In operation 1017, the second processor 123 of the electronic device 101 may return to operating in the normal input mode. The second processor 123 may enter the normal input mode after activating the first processor 1016, and may deliver an input signal, detected by the input device 150, to the first processor 1016.

Figure 11:
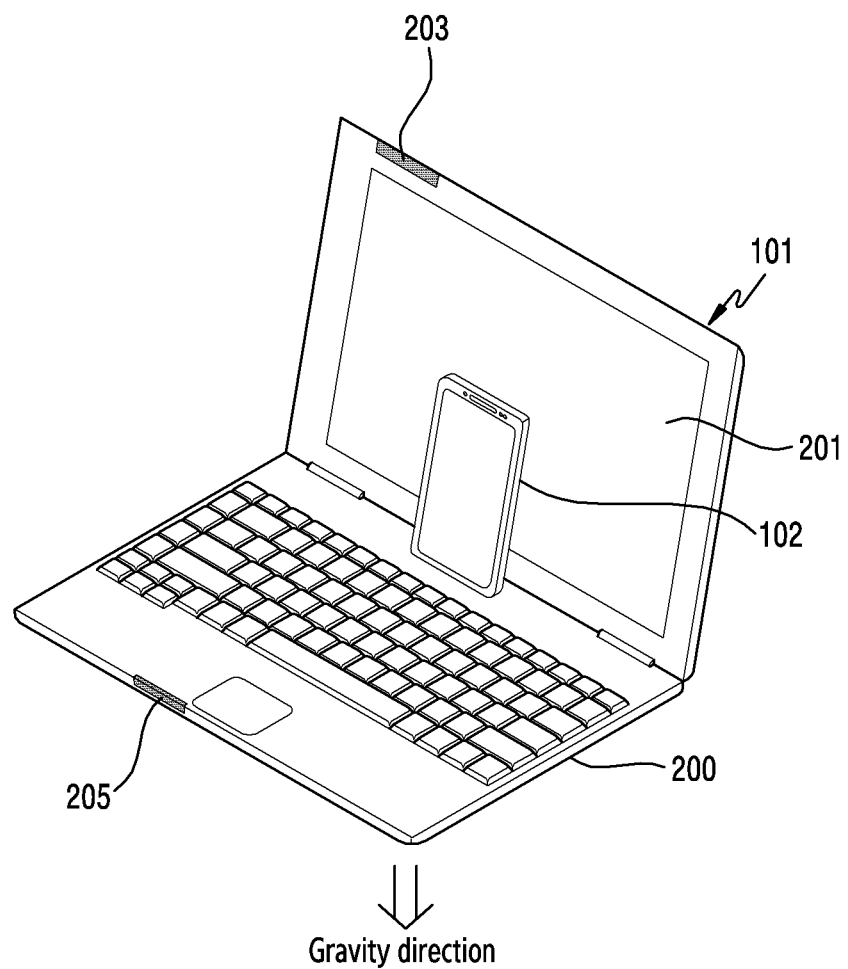
FIG. 11 is a diagram illustrating an example of utilizing an external input mode of an electronic device according to various embodiments.

FIG. 11 is a diagram illustrating an example of utilizing an external input mode of an electronic device according to various embodiments.

Referring to FIG. 11, the electronic device 101 may operate in an external input mode in a state in which a display side of the display device 201 (e.g., the display device 160) and an input side of the input device 200 (e.g., the input device 150) are arranged to have a specific angle (e.g., 90 degrees) therebetween. For example, when it is requested to switch to the external input mode while the display device 201 is turned on, the electronic device 101 may turn off the display device 201, and may allow the input device 200 to operate in the external input mode. For example, the electronic device 101 may operate in the external input mode based on a user input (e.g., selection of an external input button) other than sensing data. In this case, the user may use the display device 201 as a cradle of the external device 102, and may use the input device 200 as an input device of the external device 102.

A method of operating an electronic device according to various embodiments may include receiving sensing data detected by a sensor module of the electronic device, determining whether the sensing data meet a predetermined condition, and operating an input device of the electronic device in an external input mode if the sensing data meet the predetermined condition.

The operating of the input device in an external input mode may include, if the input device operates in the external input mode, transmitting a user input signal detected (received) by the input device to a communication module of the electronic device.

The operating of the input device in an external input mode may include, if the input device is switched from a normal input mode to the external input mode, switching a transmission path of the input device, from a first path to a second path.

The operating of the input device in an external input mode may further include, if the input device is switched from the normal input mode to the external input mode, broadcasting a connecting signal for pairing with an external device, connecting to the external device that transmits a verification signal in response to the broadcasted connecting signal, and transmitting a user input signal detected by the input device to the connected external device.

The method may further include, if the verification signal is not received in response to the connecting signal within a predetermined time duration, turning off the electronic device.

The method may further include, if the input device operates in a normal input mode, using a user input signal detected (received) by the input device internally in the electronic device.

The method may further include, if a user input detected (received) in turn-off state of the electronic device is a request for the external input mode, operating the input device in the external input mode.

The method may further include, if a switching to the external input mode is requested in turn-on state of the electronic device, operating the input device in the external input mode.

A computer readable recording medium according to various embodiments may include a program including instructions, that when executed, cause an electronic device to perform operations of receiving sensing data detected by a sensor module of the electronic device, determining whether the sensing data meet a predetermined condition, and operating an input device of the electronic device in an external input mode if the sensing data meet the predetermined condition.

An electronic device according to various embodiments disclosed in the present disclosure may be one of various types of electronic devices. The electronic devices may include, for example, and without limitation, at least one of a portable communication device (e.g., a smart phone), a computer device, a portable multimedia device, a portable medical device, a camera, a wearable device, and/or a home appliance, or the like. According to an embodiment of the disclosure, the electronic devices are not limited to those described above.

In various embodiments disclosed in the present disclosure, a singular expression may include a plural expression unless there is a contextually distinctive difference. In the present document, expressions such as "A or B", "at least one of A and/or B", "A, B, or C", or "at least one of A, B, and/or C" may include all possible combinations of items enumerated together. Expressions such as "$1^{st}$" and "$2^{nd}$" or "first" and "second" may be used to simply distinguish a corresponding element from another, and does not limit the element in any other aspect (e.g., importance or order). When a certain (e.g., $1^{st}$) element is mentioned as being "operatively or communicatively coupled with/to" or "connected to" a different (e.g., $2^{nd}$) element, the certain element may be directly coupled with/to another element or can be coupled with/to the different element via another (e.g., $3^{rd}$) element.

As used herein, the term "module" may refer, for example, to a unit implemented in hardware, software, and/or firmware, and/or any combinations thereof, and may interchangeably be used with other terms, for example, "logic", "logic block", "component", or "circuitry". The module may be a single integral component, or a minimum unit or part thereof, adapted to perform one or more functions. For example, and without limitation, the module may be implemented with an Application-Specific Integrated Circuit (ASIC), or the like.

Various embodiments of the present disclosure may be implemented as software (e.g., the program 140) including instructions that are stored a storage medium (e.g., the internal memory 136 or the external memory 138) that is readable by a machine (e.g., a computer). The machine may include an electronic device (e.g., the electronic device 101) according to various example embodiments, as a device which invokes the stored instructions from the medium and is operable according to the instruction invoked. When the instruction is executed by a processor (e.g., the processor 120), the processor may perform a function corresponding to the instruction using other elements directly or under the control of the processor. The instruction may include a code generated or executed by a compiler or an interpreter, or the like. The machine-readable storage medium may be provided in the form of a non-transitory storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., Compact Disc Read Only Memory (CD-ROM)), or be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each element (e.g., a module or a program) according to various embodiments may include a single entity or multiple entities. According to various embodiments, some of the above-described sub elements may be omitted, or other sub elements may be further included. Alternatively or additionally, some elements (e.g., modules or programs) may be integrated into a single entity, and thus may perform functions in the same or similar manner as they are performed by corresponding respective elements before the integration. According to various embodiments, operations performed by the module, the program, or another element may be carried out sequentially, in parallel, repeatedly, or heuristically, or at least some operations may be executed in a different order or omitted, or other operations may be added.

While the disclosure has been described with reference to various example embodiments thereof, it will be understood by those skilled in the art that various modifications, alternatives and/or changes may be made without departing from the true spirit and full scope of the disclosure as, for example, defined in the appended claims.

What is claimed is:

1. An electronic device comprising:
    a display disposed in a first housing;
    an input device comprising input circuitry, configured to control the electronic device in which the input device is provided in a normal input mode, disposed in a second housing arranged to face the display device;
    a first sensor module disposed in the first housing;
    a second sensor module disposed in the second housing;
    a communication module comprising communication circuitry; and
    a processor electrically connected with the display, the input device, the first sensor module and the second sensor module, the processor configured to:
    determine whether sensing data provided by the first sensor module and sensing data provided by the second sensor module meet a predetermined condition regarding orientations of the first and second housings relative to each other, and
    switch the input device from the normal input mode for controlling the electronic device to an external input mode for controlling an external device, which is external to the electronic device, based on a determination that the sensing data provided by the first sensor and the sensing data provided by the second sensor meets the predetermined condition regarding orientations of the first and second housings relative to each other.

2. The electronic device of claim 1, wherein the processor is configured to transmit a user input signal received by the input device to the communication module if the input device operates in the external input mode.

3. The electronic device of claim 1, wherein the processor is configured to switch a transmission path of a user input signal received by the input device from a first path to a second path if the input device is switched from the normal input mode to the external input mode.

4. The electronic device of claim 3, wherein the processor is further configured to:
broadcast a connecting signal for pairing with an external device if the input device is switched from the normal input mode to the external input mode, and
connect to an external device that transmits a verification signal in response to the broadcast connecting signal.

5. The electronic device of claim 4, wherein the communication module is configured to transmit the user input signal received by the input device to the connected external device.

6. The electronic device of claim 4, wherein the processor is further configured to turn off the electronic device if the verification signal from the external device is not received within a predetermined time duration.

7. The electronic device of claim 1, further comprising a main processor, and
wherein the processor is configured to transmit a user input signal received by the input device to the main processor if the input device operates in the normal input mode.

8. The electronic device of claim 7, wherein the main processor is configured to turn off the display device and to operate in a sleep mode while the input device is operating in the external input mode.

9. The electronic device of claim 7, wherein the main processor is configured to:
determine whether an automatic input mode switching is set if a request to turn off power is received, and
operate in a sleep mode if the automatic input mode switching is set, and
wherein the processor is further configured to:
operate the input device in the external input mode based on the sensing data meeting the predetermined condition.

10. The electronic device of claim 9, wherein the main processor is further configured to:
turn off the electronic device if the automatic input mode switching is not set.

11. The electronic device of claim 1, wherein the processor is configured to:
operate the input device in the external input mode if a user input received in a turn-off state is a request for the external input mode.

12. The electronic device of claim 1, wherein the processor is configured to:
operate the input device in the external input mode if a switching to the external input mode is requested in a turn-on state.

13. A method of operating an electronic device including an input device and a display, the method comprising:
acquiring sensing data provided by a sensor module of the electronic device;
determining whether the sensing data meet a predetermined condition; and
switching an input device of the electronic device from a normal input mode for controlling the electronic device in which the input device is provided to an external input mode for controlling an external device, which is external to the electronic device, based on determining that the sensing data meets the predetermined condition regarding orientations of first and second housings of the electronic device relative to each other.

14. The method of claim 13, wherein operating of the input device in an external input mode comprises:
transmitting a user input signal received by the input device to a communication module of the electronic device if the input device operates in the external input mode.

15. The method of claim 13, wherein operating of the input device in an external input mode comprises:
switching a transmission path of the input device from a first path to a second path if the input device is switched from the normal input mode to the external input mode.

16. The method of claim 15, wherein operating of the input device in an external input mode further comprises:
broadcasting a connecting signal for pairing with an external device if the input device is switched from the normal input mode to the external input mode;
connecting to an external device that transmits a verification signal in response to the broadcast connecting signal; and
transmitting a user input signal received by the input device to the connected external device.

17. The method of claim 16, further comprising:
turning off the electronic device if the verification signal is not received in response to the connecting signal within a predetermined time duration.

18. The method of claim 13, further comprising:
using a user input signal detected by the input device internally in the electronic device if the input device operates in the normal input mode.

19. The method of claim 13, further comprising:
operating the input device in the external input mode if a user input received in turn-off state of the electronic device is a request for the external input mode.

20. The method of claim 13, further comprising:
operating the input device in the external input mode if a switching to the external input mode is requested in turn-on state of the electronic device.

* * * * *